US007567245B2

(12) United States Patent
Mamata

(10) Patent No.: US 7,567,245 B2
(45) Date of Patent: Jul. 28, 2009

(54) INFORMATION PROCESSING DEVICE AND DISPLAY BRIGHTNESS CONTROL METHOD

(75) Inventor: Tohru Mamata, Akiruno (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 603 days.

(21) Appl. No.: 10/798,783

(22) Filed: Mar. 12, 2004

(65) Prior Publication Data

US 2004/0223007 A1 Nov. 11, 2004

(30) Foreign Application Priority Data

Mar. 13, 2003 (JP) ............................. 2003-067557

(51) Int. Cl.
*G06F 3/038* (2006.01)

(52) U.S. Cl. ....................................... 345/207; 345/102

(58) Field of Classification Search ................. 345/102, 345/207, 212, 690; 348/202; 340/815.75; 250/200
See application file for complete search history.

(56) References Cited

U.S. PATENT DOCUMENTS

| | | | | |
|---|---|---|---|---|
| 6,507,286 B2 * | 1/2003 | Weindorf et al. | ....... | 340/815.75 |
| 6,812,649 B2 * | 11/2004 | Kim | ........................... | 315/149 |
| 2002/0118182 A1 * | 8/2002 | Luther Weindorf | ......... | 345/204 |

FOREIGN PATENT DOCUMENTS

| | | |
|---|---|---|
| GB | 2 285 329 A | 7/1995 |
| JP | 10-228010 | 8/1998 |
| JP | 2001-184046 | 7/2001 |

OTHER PUBLICATIONS

European Search Report dated May 21, 2007 for Appln. No. 04005899.2-2205.

* cited by examiner

*Primary Examiner*—Chanh Nguyen
*Assistant Examiner*—Pegeman Karimi
(74) *Attorney, Agent, or Firm*—Pillsbury Winthrop Shaw Pittman

(57) ABSTRACT

An information processing device comprises a display unit whose display brightness is changeable, a unit for detecting the lightness of surroundings, a unit for determining a target display brightness of the display unit responsive to the lightness detected by the unit for detecting the lightness, and a unit for changing the display brightness of the display unit in steps until the target display brightness is reached when changing the display brightness to the target display brightness determined by the unit for determining the target display brightness.

10 Claims, 7 Drawing Sheets

INFORMATION PROCESSING DEVICE AND DISPLAY BRIGHTNESS CONTROL METHOD

CROSS-REFERENCE TO RELATED APPLICATIONS

This application is based upon and claims the benefit of priority from prior Japanese Patent Application No. 2003-067557, filed Mar. 13, 2003, the entire contents of which are incorporated herein by reference.

BACKGROUND OF THE INVENTION

1. Field of the Invention

The present invention relates to an information processing device having a display unit adapted to be capable of controlling the display brightness and a display brightness control method.

2. Description of the Related Art

In recent years, information processing devices exemplified by personal computers have become remarkably widespread and such portability as makes equipment easy to carry about has been regarded as important. Many of such information processing devices are equipped with a flat-panel display typified by a liquid crystal display. When a user carries an information processing device having such a display and uses it while moving, depending on the lightness of surroundings, the display may become less easy to view. That is, if the brightness of the display set low in light surroundings, the display will be less easily viewed because of its poor brightness. If, on the other hand, the brightness of the display set high in dark environments, it will also be less easily viewed because it is too bright.

Taking such a problem into consideration, a device has been proposed which detects the lightness of surroundings and adjusts the brightness of a display in accordance with the detected lightness (see, for example, Japanese Patent Application KOKAI Publication No. 10-228010). Such a device is particularly useful for portable electronic equipment because the display brightness is automatically controlled in accordance with the lightness of surroundings. In addition, a technique has been proposed which, in changing the display brightness depending on which of mains power supply and battery pack is used, gradually changes the brightness (see, for example, Japanese Patent Application KOKAI Publication No. 2001-184046, pp. 7-10, FIG. 3A).

With the above information processing device equipped with the automatic brightness adjustment mechanism, it is easy to handle at the time of usual use because the display brightness is automatically adjusted according to the lightness of surroundings. However, if the lightness of surroundings were changed frequently and the display brightness were changed correspondingly, the user would feel visual fatigue.

In the technique to gradually change the display brightness when the brightness is varied according to the type of power supply used as disclosed in Japanese Patent Application KOKAI Publication No. 2001-184046, the user can switch power supplies between AC power supply and battery pack at will but cannot intentionally change the display brightness. Each time a person passes by the personal computer and it is shaded by the person, the display brightness will be changed frequently, which will give a strong visual stimulus and tired feeling to the user.

As described above, the brightness adjustment mechanism, which automatically controls the display brightness according to the lightness of surroundings, has a problem with respect to use in places with varying degrees of lightness.

BRIEF SUMMARY OF THE INVENTION

It is an object of the present invention to provide an information processing device which is capable of changing the display brightness according to the lightness of surroundings which permits the brightness to be changed step by step until reaching a target brightness.

An information processing device according to an aspect of the present invention is characterized by comprising: a display unit whose display brightness is changeable; means for detecting the lightness of surroundings; means for determining a target display brightness of the display unit responsive to the lightness detected by the means for detecting the lightness; and means for changing the display brightness of the display unit in steps until the target display brightness is reached when changing the display brightness to the target display brightness determined by the means for determining the target display brightness.

DETAILED DESCRIPTION OF THE INVENTION

The preferred embodiments of the present invention will be described hereinafter with reference to the accompanying drawings.

Figure 1:
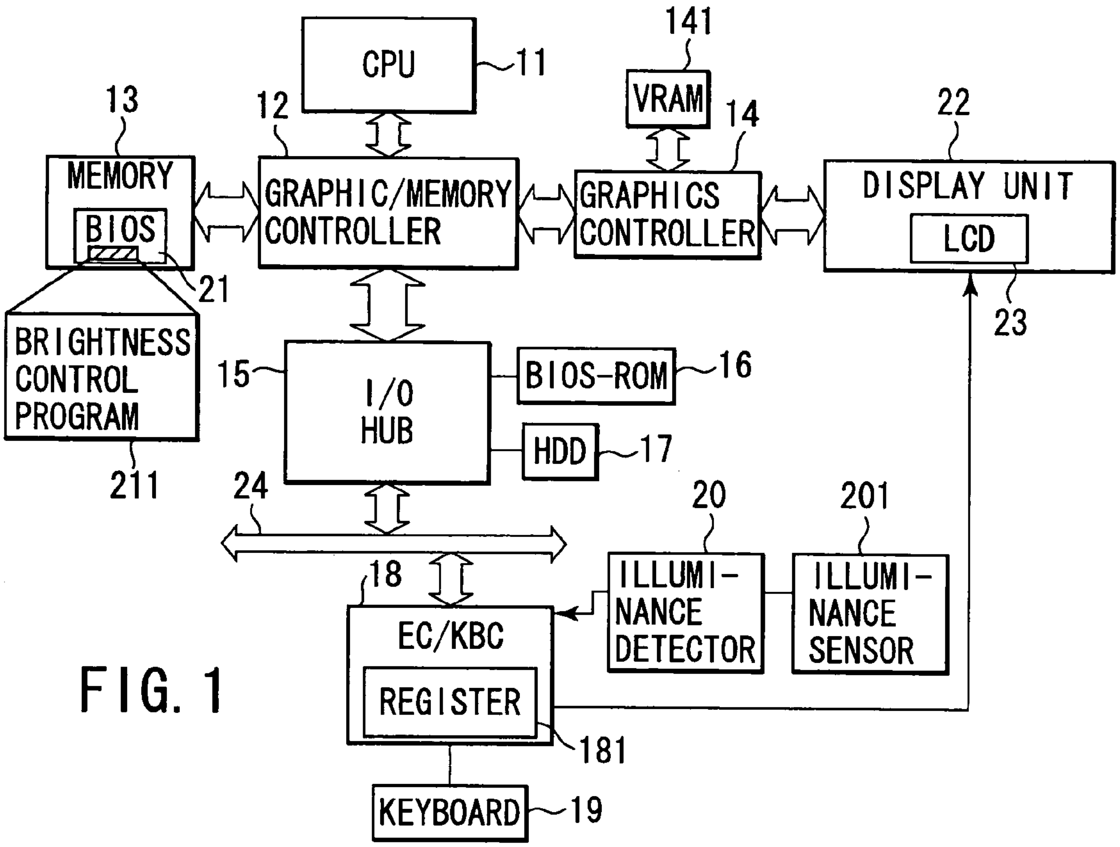
FIG. 1 is a schematic block diagram of an information processing device according to a first embodiment of the present invention.
Figure 2:
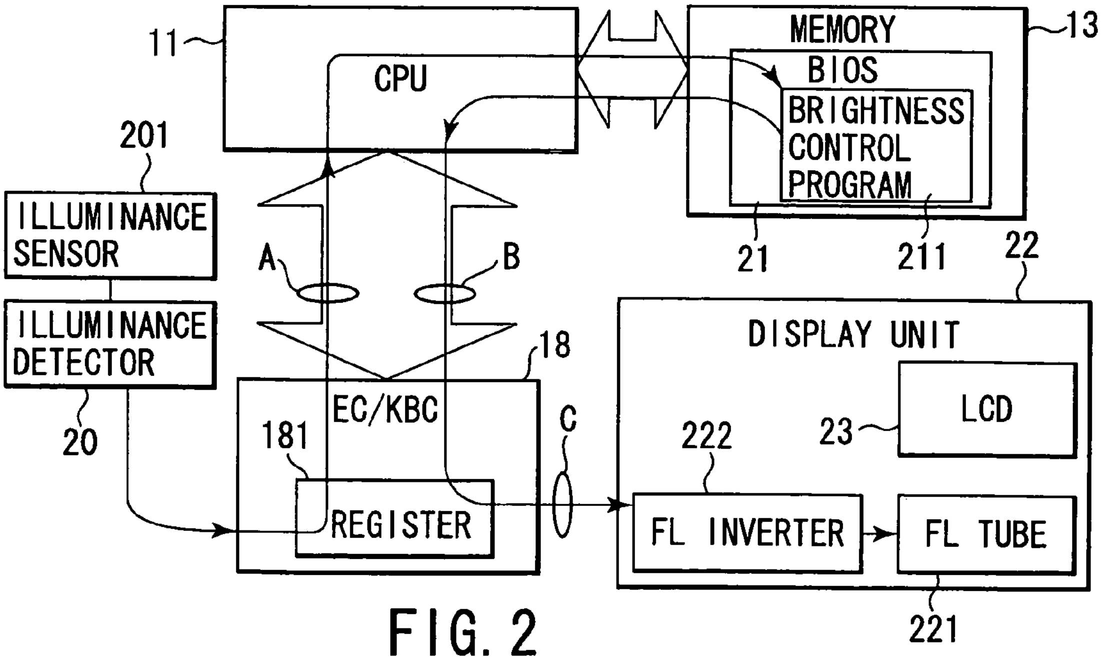
FIG. 2 is a block diagram of the main part of the computer system in the first embodiment.
Figure 3:
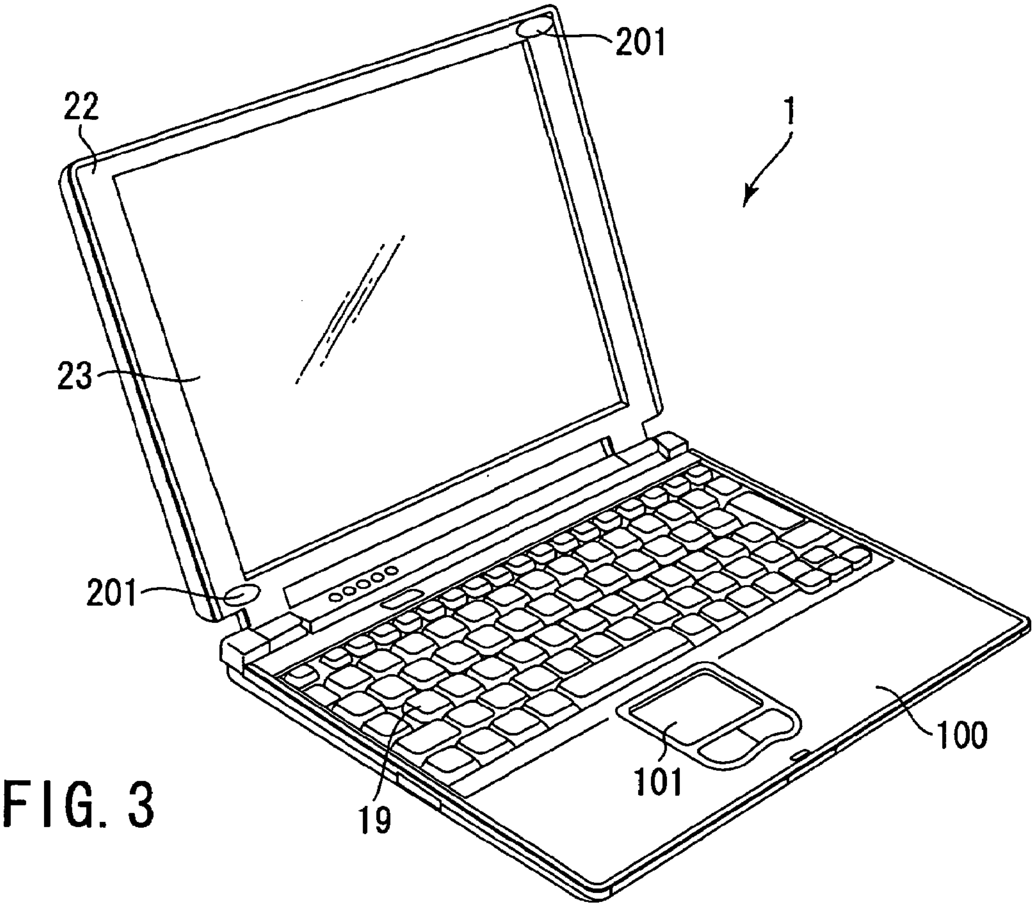
FIG. 3 is an external perspective view of a personal computer in the first embodiment.

FIG. 1 is a schematic block diagram of an information processing device according to a first embodiment of the present invention. FIG. 2 is a block diagram of the main part of the computer system in the first embodiment. FIG. 3 is an external perspective view of a personal computer in the first embodiment. FIG. 1 shows the configuration of a battery-driven notebook personal computer by way of example.

A personal computer 1 comprises a CPU 11, a graphics/memory controller hub 12, a memory (main storage) 13, a graphics controller 14, an I/O hub 15, a BIOS-ROM 16, a hard disk drive (HDD) 17, an embedded controller/keyboard controller (hereinafter referred simply to as EC/KBC) 18, a keyboard 19, and an illuminance detector 20, as shown in FIG. 1.

The CPU 11 controls the overall operation of the personal computer 1 and executes corresponding data processing by referring to the contents of the memory 13.

The memory 13 temporarily stores an operating system (hereinafter referred to as OS) and application software to be executed. The CPU 11 refers to application software stored in the memory 13. At the start of the personal computer 1, a BIOS program 21 needed when the OS is in execution is read from the BIOS-ROM 16 and stored in the memory 13. The BIOS program 21 contains a brightness control program 211 according to the first embodiment.

The graphics controller 14 is connected to the VRAM 141 and the display unit 22. Under control of the OS executed by the CPU 11, the graphics controller 14 controls an LCD (Liquid Crystal Display) 23 installed in the display unit 22 and external display units connected via interfaces (not shown), such as a CRT terminal, a DVI terminal, a TV terminal, etc.

The VRAM 141 is a memory device controlled by the graphics controller 14 and temporarily stores image data to be display on the LCD 23. By means of the graphics controller 14, video data sent from the graphic/memory controller 12 is written into or read from the VRAM 141.

The I/O hub 15 is a bridge circuit, which performs data conversion between devices on an LPC (Low Pin Count) bus 24 connected to the I/O hub 15 and the graphic memory controller hub 12, and incorporates various I/O controllers.

The BIOS-ROM 16 is a program into which function running routines to make access to various pieces of hardware within the personal computer are organized and is comprised of a flush ROM so that the stored program can be rewritten. At the time of switching on the personal computer 1, the program initializes various pieces of hardware and its part is copied into the memory 13 to perform input/output control on hardware even when the OS is in execution.

The HDD 17 is a nonvolatile data storage device and is capable of holding data even in the state where the personal computer 1 is switched off. The HDD 17 stores the OS, various applications, drivers, utility software, and contents data such as music and video. These data are read onto the memory 13 as needed and processed by the CPU 11.

The EC/KBC 18 has a plurality of registers 181 built in, which can be read from or written into by the CPU 11. The use of the registers 181 allows communications between the CPU 11 and devices connected to the EC/KBC 18. The EC/KBC 18 has also a keyboard controller function built in, which processes signals input from the keyboard 19 connected to the EC/KBC and sends the results of processing to a host device such as the CPU 11.

The illuminance detector 20 is equipped with an illuminance sensor 201 and adapted to detect the lightness of surroundings and send the detected data to the EC/KBC 18. In this embodiment, the illuminance data is read at regular intervals. A/D conversion is made four times for each reading operation and two values other than maximum and minimum values are averaged. The resulting average is sent to the EC/KBC as an illuminance reading.

When the lightness of surroundings has changed, the EC/KBC (EC) 19 obtains detected illuminance data from the illuminance detector 20 and stores it into the register 181. The CPU 11 reads in the illuminance data and performs brightness control processing based on the brightness control program 211 contained in the BIOS program 21. As a result, brightness data to control the brightness of the LCD 23 is written into the register 181 in the EC/KBC 18. The EC/KCB 18 then sets the display brightness of the LCD 23 on the basis of the brightness data.

A specific example of controlling the display brightness of the LCD 23 will be described below with reference to FIG. 2.

The display unit 22 has the LCD 23, an FL (Fluorescent) tube 221 that directs light onto the LCD, and an FL inverter 222 that controls the lighting of the FL tube.

The FL tube 221, which is a device that emits light in response to a voltage supplied from the FL inverter 222, is designed so as to provide maximum brightness at a temperature of 40 degrees or so.

The FL inverter 222, which is a circuit that produces a high voltage for lighting the FL tube 221, boosts a low input voltage of the order of 5 to 20 V to a voltage of the order of 500 to 1000 V required to cause the FL tube 221 to emit light. The FL inverter 222 also controls a voltage to be applied to the FL tube 14 and the timing of voltage application in response to analog signals from the EC/KBC 18.

The CPU 11 carries out brightness control processing in accordance with the brightness control program 211 stored in the memory 13. Based on the brightness control program 211, the CPU 11 acquires illuminance detected data (A) from the illuminance detector 20 via the EC/KCB 18, then determines the optimum brightness value for the current use environment on the basis of the detected data value and settings and sets brightness adjustment data (B) having the optimum brightness value in the FL inverter 222 as brightness setting data [C]. In this case, in changing the display brightness on the basis of the brightness adjustment data (B), the EC/KBC 18 changes the display brightness from the current brightness to target brightness in steps with time as opposed to changing the brightness abruptly.

Referring to FIG. 3, there is illustrated, in exterior perspective view, the personal computer 1 in the first embodiment. The personal computer is illustrated here in the form of a notebook personal computer by way of example. The personal computer 1 shown in FIG. 3 is composed of a body 100 and the display unit 22. The LCD 23 is incorporated into the display unit 22. The display unit 22 is mounted to the body 100 rotatably between the position in which it is opened and the position in which it is closed.

The body 100 has a housing in the form of a thin box and has the keyboard 19 mounted on the top. The armrest is formed on the top of the body 100 in front of the keyboard 19. A touch panel 101 is provided in the center of the armrest.

The display unit 22 is provided with the illuminance sensor 201 at the side of the LCD 23, which detects the lightness of surroundings (the intensity of light). A detected illuminance signal obtained from the illuminance sensor 201 is sent by the illuminance detector 20 to the EC/KBC 18 as detected illuminance data.

Figure 4:
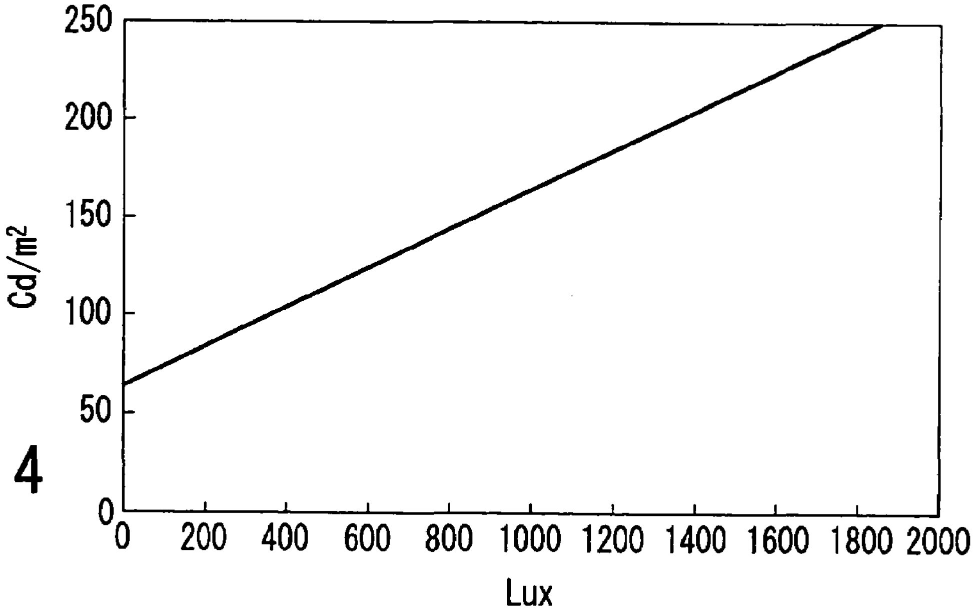
FIG. 4 shows a display brightness setting pattern stored in a brightness control program in the first embodiment.

FIG. 4 shows a display brightness setting pattern contained in the brightness control program in the first embodiment of the present invention. In FIG. 4, illuminance values (lux) detected by the illuminance sensor 201 are shown on the horizontal axis and brightness values (candela per square meter: $cd/m^2$) representing the brightness of the LCD 23 are shown on the vertical axis. In this example of brightness correction, the greater the illuminance is, the higher the brightness is made; however, this is not restrictive.

For example, when the illuminance is 400 lux, the brightness of the LCD 23 is set at about 100 $cd/m^2$. When the illuminance is 800 lux, the brightness of the LCD 23 is set at about 140 $cd/m^2$. In the present embodiment, as shown in FIG. 4, the brightness is adjusted over the range of 45 to 250 $cd/m^2$ and this range is divided into 256 steps. The brightness is changed by one step every predetermined interval of time until the target brightness is reached.

Figure 5:
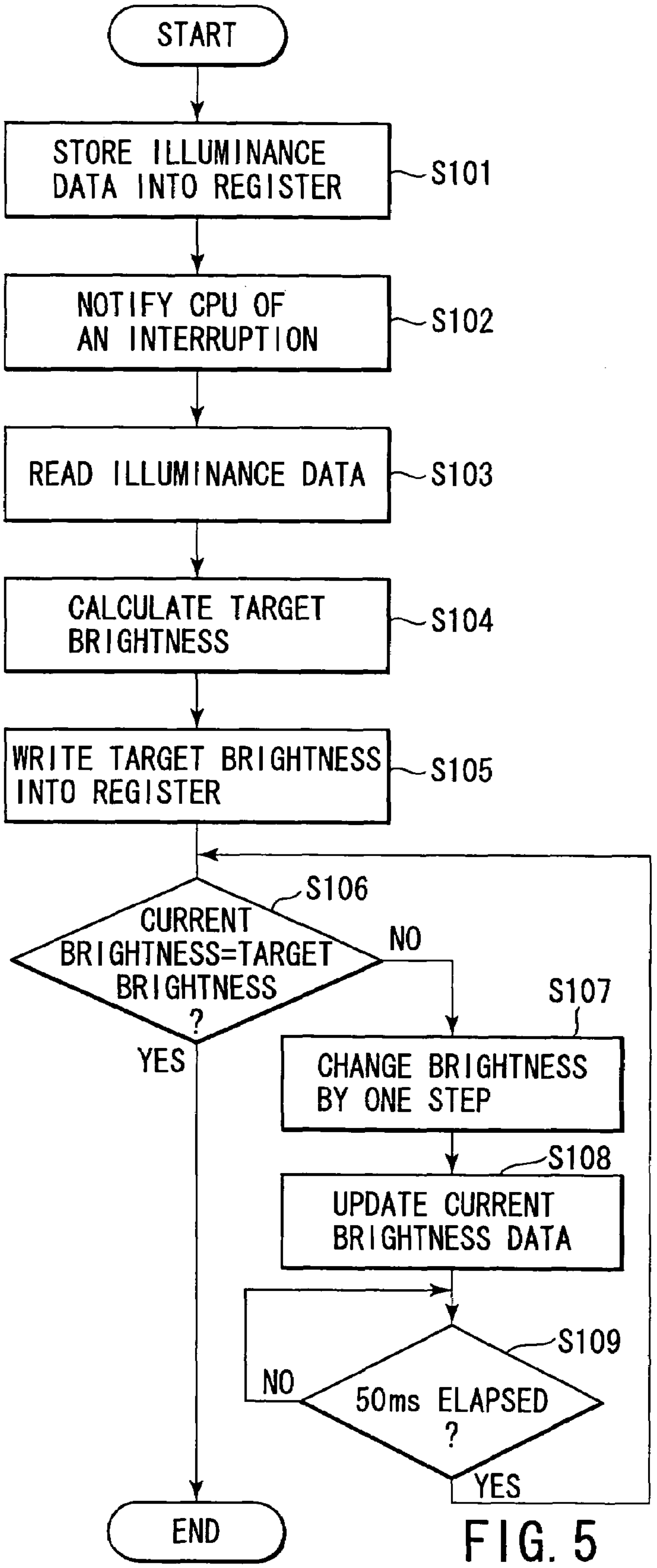
FIG. 5 is a flowchart of controlling display brightness in the first embodiment.
Figure 6:
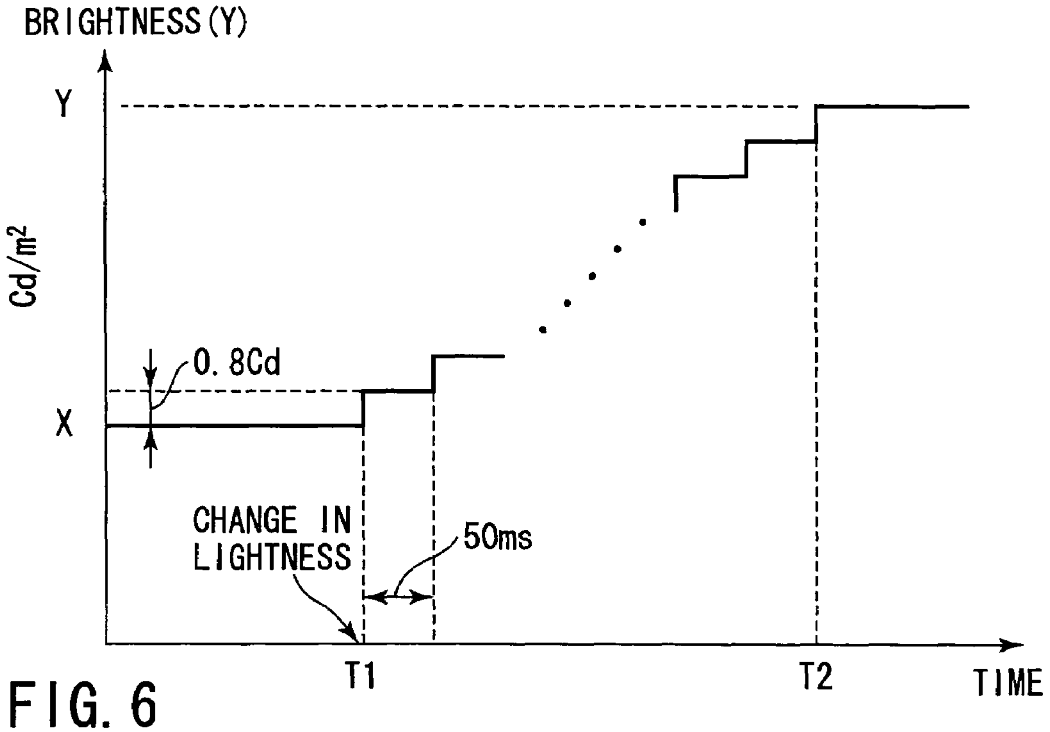
FIG. 6 is a diagram illustrating changes in display brightness when the lightness of surroundings has changed.
Figure 7:
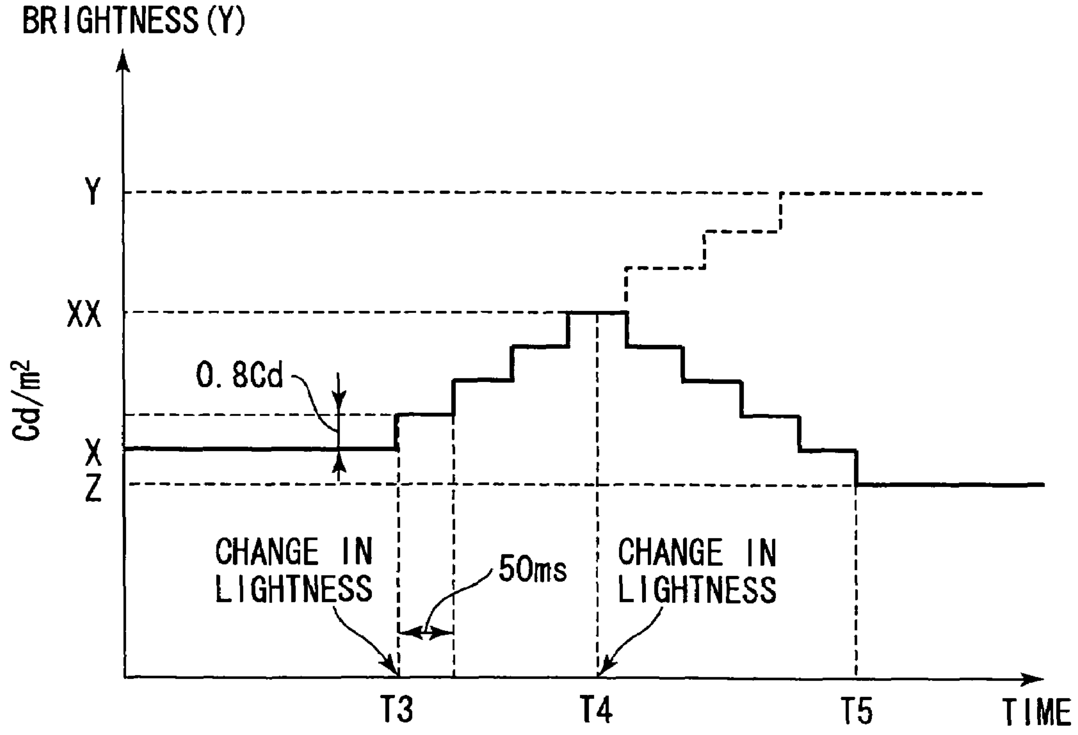
FIG. 7 is a diagram illustrating changes in display brightness when the lightness of surroundings has changed.

Reference is now made to FIGS. 5, 6 and 7 to describe the brightness control processing of the present embodiment.

FIG. 5 is a flowchart for brightness control in the first embodiment of the present invention.

A detected illuminance signal obtained from the illuminance detector 201 is sent from the illuminance detector 20 to the EC/KCB 18 as detected illuminance data and then stored into the register 181 (step S101). When the value in the register has changed, the EC/KBC 18 considers the lightness of surroundings to have changed and notifies the CPU 11 of an interruption (step S102). The CPU 11 then reads the illuminance data out of the register 181 in the EC/KBC 18 (step S103).

Based on the brightness control program 211, the CPU 11 calculates the to-be-set brightness value (target brightness value) of the LCD 23 corresponding to the read illuminance data (step S104).

The target brightness value calculated based on the control brightness program 211 is written into the register 181 (step S105). The EC/KBC 18 retains the current brightness value in the register 181 and makes a comparison between the current brightness and the target brightness (step S106).

If the current brightness and the target brightness agree with each other (YES in step S106), there is no need to change the brightness and the brightness control processing is complete.

If, on the other hand, the current brightness and the target brightness do not agree (NO in step S106), the display brightness is changed by one step in 256 steps (step S107). In the present embodiment, in changing the display brightness to the target brightness, the EC/KBC 18 supplies the FL inverter 222 with a voltage signal whose voltage changes in steps. The voltage signal is changed over a range of 0 to 3.3 V and correspondingly the display brightness is varied from 45 to 250 cd/m$^2$. Since this range is divided into 256 ranges, to change the display brightness by one step, the voltage value to the FL inverter is changed by 13 mV. To increase the display brightness by one step, the voltage value is increased by 13 mV. To decrease the brightness by one step, the voltage value is decreased by 13 mV. Correspondingly, the display brightness is varied by 0.8 cd/m$^2$. Thus, the EC/KBC 19 supplies the FL inverter 222 with a voltage signal whose voltage is varied in 13-mV steps. In response to the voltage-varying signal from the EC/KBC 18, the FLL inverter 222 changes the applied voltage to the FL tube 221 to thereby control the intensity of light emitted by it in steps and vary the display brightness of the LCD in 0.8-cd/m$^2$ steps.

Subsequently, the current brightness data in the register 181 is updated (step S108). The time which elapses from the moment that the display brightness is changed by one step is measured. Upon the lapse of a specified length of time (50 ms in this embodiment) (step S108), a comparison is made again between the current brightness and the target brightness (step S106). The elapsed time may be set to times in the range of 30 to 100 ms by way of example.

The above processing allows the display brightness to be changed from the current brightness to the target brightness step by step.

FIGS. 6 and 7 are schematic illustrations of changing of the display brightness when the lightness of surroundings has changed in the first embodiment of the present invention.

In FIGS. 6 and 7, the horizontal axis indicates the time, while the vertical axis indicates the display brightness.

In the example of FIG. 6, when the lightness of surroundings is changed at time T1 in a state where the current brightness is X, the target brightness is determined by the brightness control program 211. When the target brightness is calculated to be Y, the display brightness is increased by 0.8 cd/m$^2$ every 50 ms in order to change the display brightness from the current level X to the target level Y. This processing allows the target brightness to be reached at time T2.

In the example of FIG. 7, when the lightness of surroundings is changed at time T3, the target brightness is determined by the brightness control program 211. When the target brightness is calculated to be Y, the display brightness is increased by 0.8 cd/m$^2$ every 50 ms in order to change the display brightness from the current brightness X to the target brightness Y. This processing allows the display brightness to be changed from the current brightness X to the target brightness Y. When the lightness of surroundings is further changed at time T4, the brightness control program calculates the target brightness Z corresponding to the changed lightness of surroundings. Then, in order to change the display brightness from the brightness XX at time T2 to the target brightness Z, the display brightness is decreased by 0.8 cd/m$^2$ every 50 ms. Thus, the display brightness is changed to the target brightness Z at time T5.

Although the first embodiment has been described as changing the display brightness over a range of 45 to 250 cd/m$^2$ in 256 steps, this is not restrictive. For example, the range over which the display brightness is adjusted can be expanded and the number of steps can be increased.

As described above, the first embodiment allows the burden to user's vision due to abrupt change in display brightness to be alleviated by changing the display brightness step by step from the current brightness to the target brightness.

A second embodiment of the present invention will be described.

The second embodiment is arranged so that, in changing the display brightness according to the lightness of surroundings, the user can choose whether to change the brightness step by step as in the first embodiment or whether to change the brightness instantly.

In the second embodiment, corresponding components to those in the first embodiment are denoted by like reference numerals and descriptions thereof are omitted. The second embodiment uses the same hardware as the first embodiment.

Figure 8:
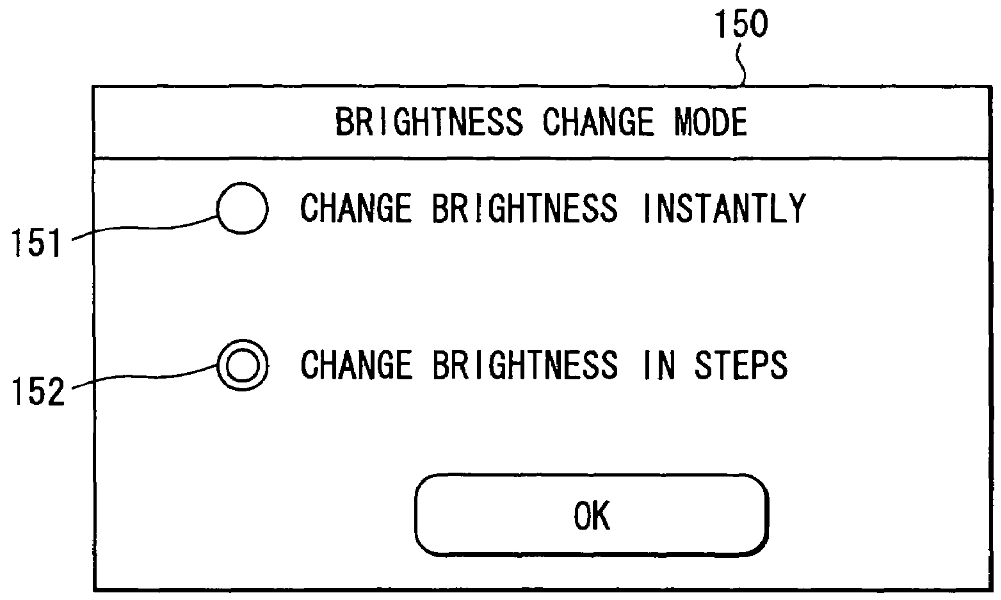
FIG. 8 shows a setting utility screen which appears in changing the display brightness in accordance with a second embodiment of the present invention.

FIG. 8 shows a brightness setting utility screen in the second embodiment of the present invention.

On a brightness change mode screen 150, the user is allowed to set either a mode 151 in which a change is made instantly from the current brightness to the target brightness (hereinafter referred to as the instant mode) or a mode 152 in which a change is made step by step from the current brightness to the target brightness (hereinafter referred to as the step-by-step mode).

A brightness control mode is set by selecting a corresponding one of circles (radio buttons) beside explanatory text for modes on the brightness change mode screen 150 with a pointing device. When a change has occurred in the lightness of surroundings, brightness control is performed in a mode thus set. The mode setting information may be stored in the register 181 in the EC/KBC 18, the memory 13, or the BIOS-ROM 16. Suppose here that the mode setting information is stored in the register 181.

Figure 9:
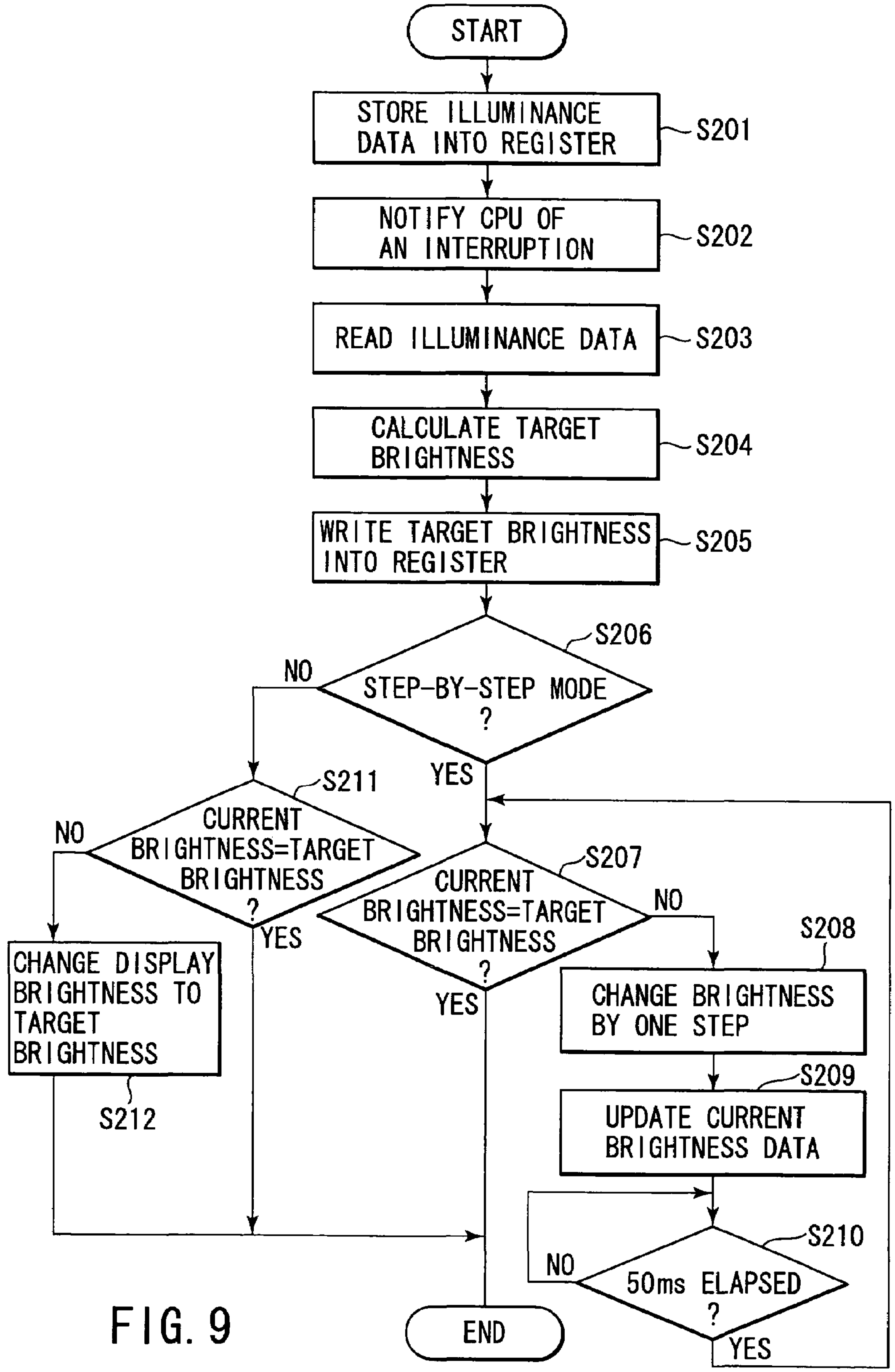
FIG. 9 is a flowchart of controlling display brightness in the second embodiment.

FIG. 9 is a flowchart for brightness control according to the second embodiment of the present invention.

In this flowchart, steps S201 through S205 are exactly the same as steps S101 through S105 shown in FIG. 5 and hence descriptions thereof are omitted.

After the target brightness value has been written into the register 181 (step S205), a decision is made as to whether or not the brightness control mode has been set to the step-by-step mode (step S206).

If the step-by-step mode has been set (YES in step S206), the EC/KBC 18 makes a comparison between the current brightness and the target brightness (step S207). If the current brightness and the target brightness agree (YES in step S207), there is no need to change the display brightness and the brightness control processing is complete.

If the current brightness and the target brightness do not agree (NO in step S207), then the display brightness is changed by one step in 256 steps (step S208). Subsequently, the current brightness data stored in the register 181 is updated (step S209). The time which elapses from the moment that the display brightness is changed by one step is measured and, upon the lapse of a specified length of time (50 ms in this embodiment) (YES in step S210), a comparison is made again between the current brightness and the target brightness (step S207).

If the brightness control mode is the instant mode (NO in step S206), the EC/KBC 18 makes a comparison between the current brightness and the target brightness (step S211). If the current brightness and the target brightness agree (YES in step S211), there is no need to change the display brightness and the brightness control processing is complete.

If the current brightness and the target brightness do not agree (NO in step S211), then the display brightness is changed to the target brightness (step S212).

Thus, it becomes possible to carry out brightness control in accordance with a set brightness control mode.

Figure 10:
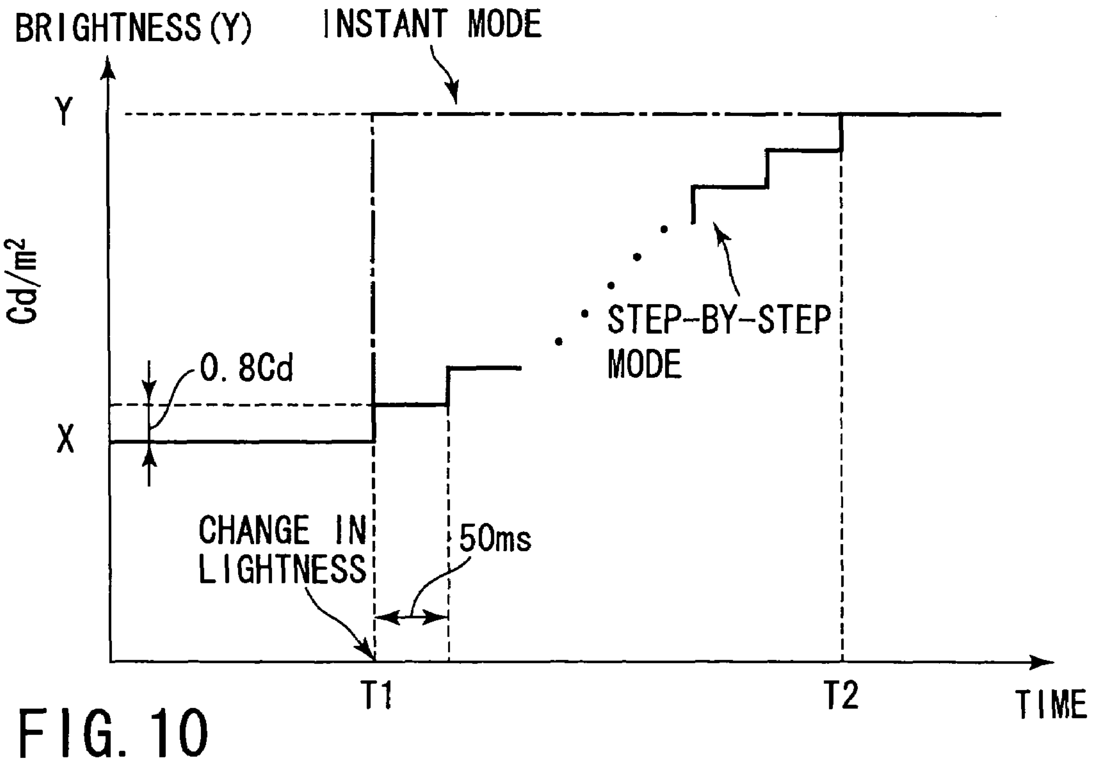
FIG. 10 is a diagram illustrating changes in display brightness when the lightness of surroundings has changed.

FIG. 10 is a schematic illustration of changing of the display brightness when the lightness of surroundings has changed in the second embodiment of the present invention. In FIG. 10, the horizontal axis indicates the time, while the vertical axis indicates the display brightness.

When the lightness of surroundings is changed at time T1 in a state where the current display brightness is X, the target brightness is determined on the basis of the brightness control program 211. When the target brightness is calculated to be Y, in the step-by-step mode the display brightness is changed in steps from X to Y as indicated by solid lines. In the instant mode, on the other hand, when the lightness of surroundings changes at time T1 as indicated by a broken line, the display brightness is changed from X to Y.

Thus, by allowing the user to choose between the mode in which the display brightness is changed instantly and the mode in which the display brightness is changed in steps, it becomes possible to carry out brightness control to user's liking or environments. It is also possible to switch between the brightness control modes depending on whether the information processing device is used indoors or outdoors.

A third embodiment of the present invention will be described next.

The third embodiment is configured to perform brightness control in steps only when the difference between the current brightness and the target brightness is larger than a predetermined value.

In the third embodiment, the display brightness is changed in steps when a specified range of brightness is exceeded in changing the display brightness to the target brightness. Within the specified range, the display brightness is changed instantly to the target brightness.

In the third embodiment, corresponding components to those in the first embodiment are denoted by like reference numerals and descriptions thereof are omitted. The third embodiment also uses the same hardware as the first embodiment.

Figure 11:
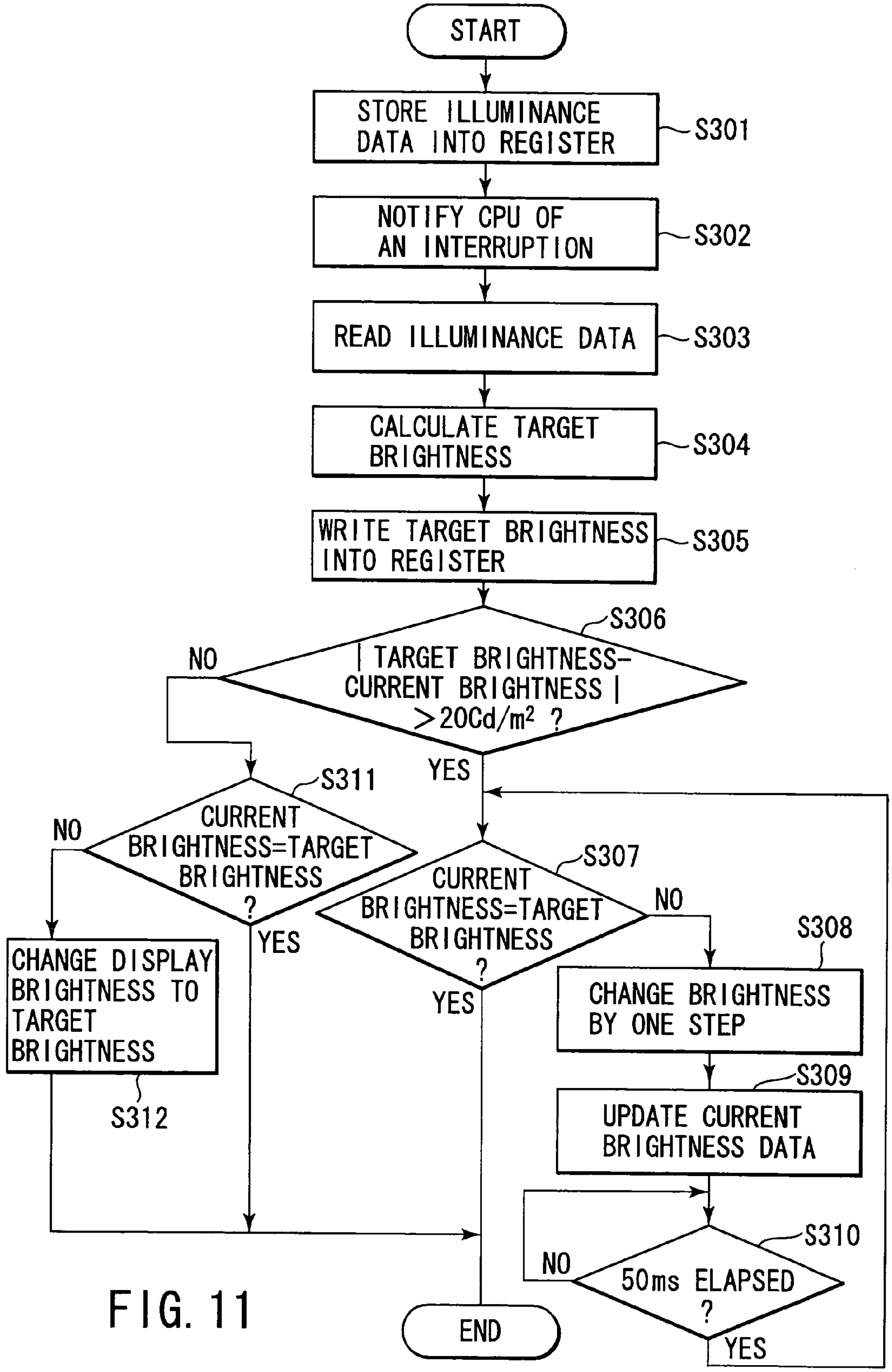
FIG. 11 is a flowchart of controlling display brightness according to a third embodiment of the present invention.

FIG. 11 is a flowchart for brightness control according to the third embodiment of the present invention.

In this flowchart, steps S301 through S305 are exactly the same as steps S101 through S105 shown in FIG. 5 and hence descriptions thereof are omitted.

After the target brightness value has been written into the register 181 (step S305), a decision is made as to whether or not the difference between the current brightness and the target brightness is greater than a predetermined value (step S306). If a great change in display brightness is involved, the user will feel visual fatigue. For this reason, in the third embodiment, when a change in display brightness is greater than the predetermined value, the display brightness is changed in steps. Otherwise, the display brightness is changed instantly to the target brightness. In the present embodiment, the decision in step S306 is made as to whether or not the absolute value of the difference between the current brightness and the target brightness is greater than 20 cd/m$^2$.

If the difference between the current brightness and the target brightness is greater than 20 cd/m$^2$, changing from the current brightness to the target brightness is carried out in steps as described in the first embodiment.

First, the EC/KBC 18 makes a comparison between the current brightness and the target brightness (step S307). If the current brightness and the target brightness agree (YES in step S307), there is no need to change the display brightness and the brightness control processing is complete.

If the current brightness and the target brightness do not agree (NO in step S307), then the display brightness is changed by one step in 256 steps (step S308). Subsequently, the current brightness data stored in the register 181 is updated (step S309). The time which elapses from the time of changing the display brightness by one step is measured and, upon the lapse of a specified length of time (50 ms in this embodiment) (YES in step S310), a comparison is made again between the current brightness and the target brightness (step S307).

If the difference between the current brightness and the target brightness is not greater than 20 cd/m$^2$ (NO in step S306), the EC/KBC 18 makes a comparison between the current brightness and the target brightness (step S311). If the current brightness and the target brightness agree (YES in step S311), there is no need to change the display brightness and the brightness control processing is complete.

If the current brightness and the target brightness do not agree (NO in step S307), then the display brightness is changed to the target brightness (step S312).

The threshold for the width of change in brightness may be set arbitrarily.

As described above, the third embodiment enable the display brightness to be changed to the target brightness in steps or instantly depending on whether the difference between the current brightness and the target brightness is large or small. It is also possible to change the threshold for judging the stepwise or instant control of brightness as needed.

The first, second and third embodiments have been described as adjusting the display brightness when the lightness of surroundings has changed as the result of detection by the illuminance sensor. When an information processing device is configured so that the display brightness can be switched among three discrete levels by operating the keyboard, it is also possible to change the display brightness in steps between the levels in accordance with the principles of the invention. Moreover, when the brightness level is changed according to the remaining energy of a battery in terms of power saving, it is possible to change the display brightness in steps as opposed to changing the brightness abruptly. Furthermore, although the embodiments have been described as the brightness control program being contained in the BIOS program, the program may be contained in the EC/KBC or may be provided in the form of dedicated software.

According to the present invention, there is provided an information processing device which is capable of changing the display brightness according to the lightness of surroundings which permits the brightness to be changed in steps until a target brightness is reached.

What is claimed is:

1. An information processing device comprising:

a display unit having changeable display brightness;

a detector configured to detect a lightness of surroundings;

a calculating unit configured to calculate a target display brightness of the display unit based on the surrounding lightness detected by the detector;

a selector configured to select a first mode when the difference between the target display brightness and the current display brightness is larger than a predetermined threshold brightness and a second mode when the difference between the target display brightness and the current display brightness is not larger than the predetermined threshold brightness; and a brightness control unit configured to supply a brightness control signal for changing a current display brightness to the display unit when the current display brightness does not equal the target display brightness, wherein, when the first mode is selected, the brightness control unit supplies a first brightness control signal changing the current display brightness by a predetermined brightness which is smaller than a difference between the current display brightness and the target brightness, and when the second mode is selected, the brightness control unit supplies a second brightness control signal changing the current display brightness by the difference.

2. The information processing device according to claim 1, further comprising an input unit configured to input a selection one of the first mode and the second mode upon a user operation.

3. The information processing device according to claim 1, wherein the predetermined brightness is obtained by dividing a brightness range of the changeable display brightness with a predetermined number.

4. The information processing device according to claim 1, wherein the predetermined threshold brightness is variable.

5. A method of controlling brightness of an information processing device having a display unit with changeable display brightness, the method comprising:

detecting a lightness of surroundings;

calculating a target display brightness of the display unit based on the detected surrounding lightness;

selecting a first mode when the difference between the target display brightness and the current display brightness is larger than a predetermined threshold brightness and a second mode when the difference between the target display brightness and the current display brightness is not larger than the predetermined threshold brightness; and supplying a brightness control signal for changing a current display brightness to the display unit when the current display brightness does not equal the target display brightness, wherein, when the first mode is selected, supplying a first brightness control signal changing the current display brightness by a predetermined brightness which is smaller than a difference between the current display brightness and the target brightness, and when the second mode is selected, supplying a second brightness control signal changing the current display brightness by the difference.

6. The method according to claim 5, further comprising enabling user input of the selecting of the first mode and the second mode.

7. The information processing device according to claim 5, further comprising setting the display brightness of the display unit to a first brightness level when a first lightness level is detected and to a second brightness level when a second lightness level is detected, and changing from the first brightness level to a third brightness level which is between the first brightness level and the second brightness level and then from the third brightness level to the second brightness level when the display brightness is changed from the first brightness level to the second brightness level.

8. The information processing device according to claim 7, further comprising changing from the first brightness level to the third brightness level and then from the third brightness level to the second brightness level after a lapse of a predetermined time period.

9. The method according to claim 5, wherein the predetermined brightness is obtained by dividing a brightness range of the changeable display brightness with a predetermined number.

10. The method according to claim 5, wherein the predetermined threshold brightness is variable.

* * * * *